United States Patent
Bauer et al.

(10) Patent No.: US 6,853,790 B1
(45) Date of Patent: Feb. 8, 2005

(54) OPTICAL WAVEGUIDES DERIVED FROM A COMBINATION OF POLY (PERFLUOROCYCLOBUTANES) AND POLYMERIC CYANATES

(75) Inventors: Monika Bauer, Senzig (DE); Jörg Bauer, Senzig (DE); Christian Dreyer, Niederwoerresbach (DE); Norbert Keil, Berlin (DE); Crispin Zawadzki, Berlin (DE)

(73) Assignee: Pirelli Cavi e Sistemi S.p.A., Milan (IT)

( * ) Notice: Subject to any disclaimer, the term of this patent is extended or adjusted under 35 U.S.C. 154(b) by 239 days.

(21) Appl. No.: 10/019,479

(22) PCT Filed: Jul. 3, 2000

(86) PCT No.: PCT/EP00/06205

§ 371 (c)(1),
(2), (4) Date: Apr. 26, 2002

(87) PCT Pub. No.: WO01/02880

PCT Pub. Date: Jan. 11, 2001

(30) Foreign Application Priority Data

Jul. 1, 1999 (EP) .............................................. 99112597

(51) Int. Cl.$^7$ ................................................. G02B 6/10
(52) U.S. Cl. ...................... 385/129; 385/143; 428/421; 428/422.8
(58) Field of Search ................................. 385/129, 143; 428/143, 421, 422.8

(56) References Cited

U.S. PATENT DOCUMENTS

| | | | | |
|---|---|---|---|---|
| 4,528,366 A | * | 7/1985 | Woo et al. | 528/422 |
| 5,037,917 A | * | 8/1991 | Babb et al. | 526/242 |
| 5,037,918 A | | 8/1991 | Babb | 198/586 |
| 5,037,919 A | | 8/1991 | Clement et al. | 526/242 |
| 5,159,038 A | | 10/1992 | Babb et al. | 526/242 |
| 5,165,959 A | * | 11/1992 | Burack et al. | 427/162 |
| 5,208,892 A | * | 5/1993 | Burack et al. | 385/129 |
| 5,246,782 A | * | 9/1993 | Kennedy et al. | 428/421 |
| 5,780,159 A | * | 7/1998 | Bauer et al. | 428/422.8 |

FOREIGN PATENT DOCUMENTS

| | | |
|---|---|---|
| DE | 1 963 447 | 6/1971 |
| EP | 0490335 A2 * | 6/1992 |
| EP | 0 490 335 A2 | 6/1992 |
| EP | 0581268 A1 * | 2/1994 |
| EP | 0 581 268 A1 | 2/1994 |
| EP | 1067405 A1 * | 1/2001 |
| WO | WO 96/11415 | 4/1996 |
| WO | WO-96-11415 * | 4/1996 |

OTHER PUBLICATIONS

Fishbeck, G. et al., "Singlemode Optical Waveguides Using a High Temperature Stable Polymer with Low Losses in the 1.55um Range", Electronics Letters, vol. 33, No. 6, pp. 518–519, (1997).
Babb, D. A. et al., "Perfluorocyclobutane Aromatic Ether Polymers", Journal of Polymer Science: Part A: Polymer Chemistry, vol. 31, pp. 3465–3477, (1993).
Kennedy, A. P. et al., "Perfluorocyclobutane Aromatic Ether Polymers. II. Thermal/Oxidative Stability and Decomposition of a Thermoset Polymer", Journal of Polymer Science: Part A: Polymer Chemistry, vol. 33, pp. 1859–1865, (1995).
Smith, D.W., Jr. et al., Perfluorocyclobutane Aromatic Ether Polymers. Synthesis and Characterization of New Siloxane-Containing Fluoropolymers, Macromolecules, vol. 29, No. 3, pp. 852–860, (1996).
Babb, D.A. et al., "Perfluorocyclobutane Aromatic Ether Polymers. III. Synthesis and Thermal Stability of a Thermoset Polymer Containing Triphenylphosphine Oxide", Journal of Applied Polymer Science, vol. 69, pp. 2005–2012, (1998).

* cited by examiner

*Primary Examiner*—David W. Wu
*Assistant Examiner*—Henry S Hu
(74) *Attorney, Agent, or Firm*—Finnegan, Henderson, Farabow, Garrett & Dunner, L.L.P.

(57) ABSTRACT

The present invention is directed to optical waveguides or waveguide systems, comprising at least (a) a first material which is a poly(perfluorocyclobutane), and in direct contact to this material, (b) a second material which is a polycyanate resin made from at least one aromatic difunctional cyanate of formula (I) wherein $R^1$ to $R^8$ are independently from each other hydrogen, optionally substituted $C_1$–$C_{10}$ alkyl, $C_3$–$C_8$ cycloalkyl, $C_1$–$C_{10}$ alkoxy, halogen, phenyl or phenoxy, the alkyl or aryl groups being unfluorinated, partly fluorinated or fully fluorinated with the proviso that (I) carries at least 1 fluorine atom, and Z is a chemical bond, $SO_2$, $CF_2$ $CH_2$, CHF, $CH(CH_3)$, isopropylene, hexafluoroisopropylene, n- or iso-$C_1$–$C_{10}$ alkylene which may be partly or fully fluorinated, O, $NR^9$ whereby $R^9$ is hydrogen or $C_1$–$C_{10}$ alkyl, N=N, CH=CH, C(O)O, CH=N, CH=N—N=CH, alkyloxyalkylene having 1 to 8 carbon atoms, S, or $Si(CH_3)_2$ optionally in mixture with other components. Preferably, both the first and the second materials are in the form of a thin layer, the layers directly adhered to each other. Either the waveguide can be made from the first material and at least one of the buffer layer and the cladding layer can be made from the second material, or vice versa.

10 Claims, No Drawings

OPTICAL WAVEGUIDES DERIVED FROM A COMBINATION OF POLY (PERFLUOROCYCLOBUTANES) AND POLYMERIC CYANATES

CROSS REFERENCE TO RELATED APPLICATIONS

This application is a national stage filing of International Application No. PCT/EP00/06205, filed Jul. 3, 2000, which published in the English language and claims priority of European Patent Application No. 99112597.2, filed on Jul. 1, 1999.

BACKGROUND OF THE INVENTION

1. Field of the Invention

The present invention is directed to waveguides or waveguide structures prepared from organic (co-)polymeric cyanates and poly(perfluorocyclobutanes) (PFCBs).

Organic polymers are increasingly interesting materials in the optical or microoptical field, in integrated optics or in microsystem techniques. In these fields, they may be used in optical instruments and apparatuses or parts thereof as well as in special optics as lenses, prisms, for fixation of optical systems, as support materials for optical layers and as translucent coating materials for mirrors or lenses. Organic polymers may be used in optical fibres and for the preparation of waveguide structures. Their technical handling is relatively easy, and their density is lower in comparison to glass.

Specifically, if such plastics or organic polymers are to be used as a waveguide, a variety of requirements are to be met. The refractive index of the material should be variable in a range as broad as possible and should be adaptable to that of specific substrates. If used in the optical communication engineering, low absorptions of the materials are required at 1.3 and 1.55 $\mu$m. The loss due to attenuation caused by volume defects (non-homogenities, microbubbles, microfissures) should be minimized. Besides specific technological requirements, e.g. preparation of layers and structurability, specific provisions for the use of organic polymers as waveguide structures in integrated optics are the thermal and thermo-mechanical stability, adapted extension coefficients and long term stability of optical properties.

2. Description of the Related Art

Until now, polymethacrylates and polycarbonates have been mainly used for optical purposes. Both classes of polymers have an excellent light transmittance, but their thermal and thermo-mechanical stability is not sufficient due to their chemical structure. Thus, polymethacrylates and polycarbonates cannot practically be used at temperatures exceeding 130° C. which is due to their relatively low glass transition temperatures. In addition, both types of polymers are linear, un-crosslinked polymers. This has the adverse effect that they are partly solubilized in case multilayer-systems are prepared via the application of dissolved components, e.g. by spin-coating each layer. Consequently, the layer structures as obtained are not sufficiently delimitated and neat which, however, is an essential for the preparation of waveguide structures.

There are other high performance polymers which have glass transition temperatures of more than 180° C. Examples are polyarylethersulfones, polyarylsulfones, polyaryletherketones, polyimides and polyetherimides, the processing of which, however, is more difficult than that of polymethacrylates and polycarbonates. Another disadvantage of these systems is the relatively high optical loss at wave lengths of 1.3 and 1.55 $\mu$m, relevant in communication engineering.

PFCBs are a relatively new class of high performance polymers. They have first been described by Babb and others in U.S. Pat. Nos. 5,037,917, 5,037,918, 5,037,919, and 5,159,038. Upon thermal curing they yield insoluble cross-linked polymers which are characterized by high thermal stability. Waveguides prepared from PFCBs in combination with buffer layers made of thermally grown $SiO_2$ have been described by Fischbeck et al., Electronic letters 33, 518 (1997). The layers prepared from PFCBs showed very low optical losses at 1550 nm (minimum: 0.2 dB/cm). Polymeric waveguide systems consisting of more than one organic polymer are not described in this paper.

In addition, it is known to use polycyanurates for the preparation of optical components. U.S. Pat. Nos. 5,208,892 and 5,165,959 describe the preparation of polycyanate resins made of a single monomer (either fluorinated or non-fluorinated). German Offenlegungsschrift DE 44 35 992 A1 described optical elements prepared from polycyanurate resins. The resins are made by polymerization of dicyanate or polycyanate compounds, optionally in mixture with di- or polyphenols or di- or polyglycidyl compounds. Like PFCBs, polycyanurates yield insoluble cross-linked polymers upon thermal curing, and these polymers are as well characterized by high thermal stability. They are specifically useful due to their excellent adhesional force on a variety of substrates, for example silicon, silica or a variety of organic polymers. Refractive index and glass transition temperature of the cured cross-linked polymers may be varied in broad ranges, due to the easy availability of a great number of di- and mono-functional cyanate monomers which may be copolymerized with each other. Polycyanurates of the kind mentioned above are partly commercially available. Completely cured polycyanurates known in the art which consequently are stable for long terms may have optical losses of about 0.2 dB/cm at 1.3 $\mu$m. However the optical losses are not less than 0.5 dB/cm at 1.55 $\mu$m which is important in communication engineering technologies.

SUMMARY OF THE INVENTION

The present invention provides a combination of components or materials at least one of which has been prepared from PFCB and at least one of which has been prepared from specific polycyanate resins (polymeric cyanates) as defined below. Combinations, especially layers of the said substances, may be combined to obtain optical wave guide systems or waveguide structures according to the present invention. It has been found that such combinations are specifically valuable in the preparation of waveguides structures having low optical losses at 1.3 and at 1.55 $\mu$m.

DETAILED DESCRIPTION OF THE INVENTION

The composition of the PFCB to be used in the present invention is not critical. For example, PFCB's as described in J. Polymer Sci.: Part A: Polymer Chem., 31, 3465 (1993); 33, 1859 (1995); Macromolecules 29, 852 (1996); and J. Appl. Polym. Sci. 69, 2005 (1998) may be advantageously used. In addition, layers of PFCB's as described in the US patents of Babb and Babb et. al. as mentioned above may be incorporated into the present optical systems.

The polycyanate resins (polymeric cyanates) may be selected from those which have a rather low refractive index adapted to that of the PFCB chosen. According to the invention, the said polymeric cyanates are formed by polymerization or copolymerization of at least one specific organic aromatic difunctional cyanate as defined below, preferably in combination with one or more of other mono- or difunctional cyanates, the polymeric cyanates consisting of or containing at least one difunctional monomer which is partly or fully fluorinated, and optionally in admixture with other substances as defined below.

"Partly fluorinated" means that at least one fluorine atom is present in the molecule. "Fully fluorinated" means that hydrogen atoms are completely substituted by fluorine atoms. The whole molecules, or single organic radicals or groups (e.g. methyl, methylene, alkyl, aryl groups), respectively, may be fully fluorinated. For the preparation of the said polymeric cyanates, one, two, three or even more monomeric cyanates may be used. The NCO groups of the cyanate monomers are bound to organic radicals via the oxygen atom.

The aromatic difunctional cyanate to be used in the present invention has a structure as given in formula I below (with the proviso that the or at least one of the cyanates chosen for (co-)polymerization carries at least one fluorine atom):

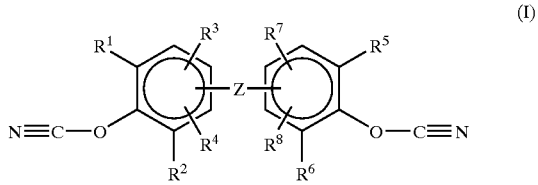

(I)

wherein $R^1$ to $R^4$ and $R^5$ to $R^8$ are independently from each other hydrogen, optionally substituted $C_1$–$C_{10}$ alkyl, $C_3$–$C_8$ cycloalkyl, $C_1$–$C_{10}$ alkoxy, halogen, phenyl or phenoxy. The alkyl or aryl groups may be unfluorinated or they may carry at least one fluorine atom. In one embodiment, at least one of the alkyl or aryl groups present in the molecule is fully fluorinated. In another embodiment, the difunctional cyanate molecule is fully fluorinated. Z is a chemical bond, $SO_2$, $CF_2$, $CH_2$, CHF, $CH(CH_3)$, isopropylene, hexafluoroisopropylene, n- or iso-$C_1$–$C_{10}$alkylene which may be partly or fully fluorinated, O, $NR^9$ ($R^9$ being hydrogen or $C_1$–$C_{10}$ alkyl), N=N, CH=CH, C(O)O, CH=N, CH=N—N=CH, alkyloxyalkylene having 1 to 8 carbon atoms which is optionally partly or fully fluorinated, S, or $Si(CH_3)_2$. Examples are 2,2'-bis(4-cyanato-phenyl)propane, 2,2'-bis(4-cyanato-phenyl)hexafluoropropane, biphenylene-4,4'dicyanate, 2, 3, 5, 6, 2', 3', 5', 6'octafluorobiphenylene-4,4'-dicyanate.

A difunctional cyanate useful for copolymerization with the difunctional cyanate of formula I has a structure as shown in formula II:

(II)

wherein $R^{10}$ is $C(R')_2$—R"—$C(R')_2$, wherein each R' is, independently from the other, hydrogen or fluorine or an optionally substituted, preferably fluorinated alkyl or alkenyl group having preferably 1 to 6, more preferably 2 to 4 carbon atoms. R' is more preferred hydrogen. R" is a non-aromatic hydrocarbon group, preferably an alkylene of 2 to 12, more preferably to 6, carbon atoms. Preferably, $R^{10}$ is a straight, branched, or cyclic non-aromatic hydrocarbon radical or a non-aromatic hydrocarbon radical comprising a cyclic structure. Preferably, the non-aromatic hydrocarbon radical has 1 to 15, more preferably 3 to 12 carbon atoms. It is to note that each of the carbon atoms of $R^{10}$ may carry 1, 2 or, if it is a terminal carbon atom, 3 fluorine atoms. Fully fluorinated carbon atoms (—$CF_3$, —$CF_2$—) are preferred. Specific examples are: N≡C—O—$CH_2$—$CF_2$—$CF_2$—$CH_2$—O—C≡N, N≡C—O—$CH_2$—$CF_2$—$CF_2$—$CF_2$—$CH_2$—O—C≡N, or N≡C—O—$CH_2$—$CF_2$—$CF_2$—$CF_2$—$CF_2$—$CH_2$—O—C≡N.

Further, the properties of the polymeric cyanates thus obtained may be modified by incorporating one or more of the following monocyanates having formula IIIa or IIIb:

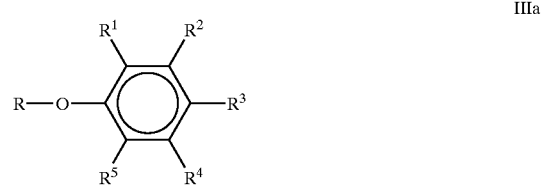

IIIa

IIIb wherein $R^1$ to $R^5$ are as previously defined for the dicyanates of formula I, R is N≡C— and $R^{11}$ is a straight, branched, or cyclic non-aromatic hydrocarbon radical or a non-aromatic hydrocarbon radical comprising a cyclic structure. Preferably, the alkyl radical has 1 to 15, more preferably 3 to 12 carbon atoms. Preferably, at least one fluorine atom is present in the monocyanate of formula IIIa or IIIb. If fluorine atoms are present in formula IIIb, $R^{11}$ is $C(R')_2$—$CFR"_2$, wherein each R' is, independently from the other, hydrogen or fluorine or an optionally substituted, preferably fluorinated alkyl or alkenyl group having preferably 1 to 13, more preferably 3 to 11 carbon atoms. Each of R" may independently be defined as R'. Further, R" may have an arylic structure. It is to note that each of the carbon atoms of R may carry 1, 2 or, if it is a terminal carbon atom, 3 fluorine atoms. Fully fluorinated carbon atoms (—$CF_3$, —$CF_2$—) are preferred. Further, it is preferred that one or both of R' are hydrogen and/or one of R" is fluorine or a partly or fully fluorinated alkyl and the other is a partly or, more preferable, fully fluorinated alkyl which may be straight, branched or cyclic. Specific examples for the cyanates of formula IIIb are N≡C—O—$CH_2$—$CF_2$—$CF_3$, N≡C—O—$CH_2$—$C(CF_3)_2$F, N≡C—O—$CH_2$—$CF_2$—$CF_2$—$CF_3$, N≡C—O—$CH_2$—CHF—$CF_2$—$CF_2$—$CF_3$, N≡C—O—$CH_2$—$CF_2$—$CF_2$—$CF_2$—$CF_2$—$CF_2$—$CF_3$, N≡C—O—$CH_2$—$CF_2$—CF=CF—$CF_2$—$CF_2$—$CF_3$. Specific examples for formula IIIa are phenylcyanate, 4-bromophenylcyanate, perfluorophenylcyanate, 3-trifluoromethylphenylcyanate.

Alternatively or in addition, the properties of the polymeric cyanates thus obtained may be modified by incorporating one or more phenols having either formula IIIa above or formula IIIc:

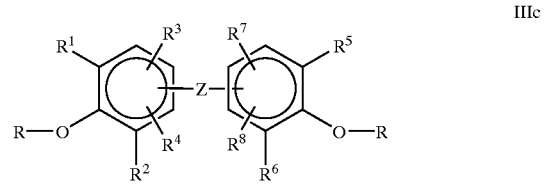

IIIc wherein Z and $R^1$ to $R^8$ are as defined above for the dicyanates of formula I, but wherein R is hydrogen. The phenols may, but must not necessarily, be partly or fully fluorinated. Examples are 2,2-bis(4-hydroxyphenyl)propane, 2,2-bis(4-hydroxyphenyl)hexafluoropropane, biphenylene-4,4'-diphenol, 2, 3, 5, 6, 2', 3', 5',6'-octafluorobiphenylene-4,4'diphenol.

Alternatively or in addition, the properties of the polymeric cyanates thus obtained may be modified by incorporating one or more monoalcohols having formula IIIb wherein $R^{11}$ is as defined above, and wherein R is hydrogen. Examples are HO—CH$_2$—CF$_2$—CF$_3$, HO—CH$_2$—C(CF$_3$)$_2$F, HO—CH$_2$—CF$_2$—CF$_2$—CF$_3$, HO-CH$_2$—CHF—CF$_2$—CF$_2$—CF$_3$, HO—CH$_2$—CF$_2$—CF$_2$—CF$_2$—CF$_2$—CF$_3$, HO—CH$_2$—CF$_2$—CF=CF—CF$_2$—CF$_2$—CF$_3$.

Alternatively or in addition, the properties of the polymeric cyanates thus obtained may be modified by incorporating one or more non-aromatic dihydroxy compounds having formula IIId

R—O—R$^{10}$—O—R    IIId wherein R is hydrogen and $R^{10}$ is as defined for the dicyanates of formula II above. Examples are HO—CH$_2$—CF$_2$—CF$_2$—CH$_2$—OH, HO—CH$_2$—CF$_2$—CF$_2$—CF$_2$—CF$_2$—CH$_2$—OH, HO—CH$_2$—CF$_2$—CF$_2$—CF$_2$—CF$_2$—CF$_2$—CF$_2$—CH$_2$—OH.

Alternatively or in addition, the properties of the polymeric cyanates thus obtained may be modified by incorporating one or more glycidethers of formulas IIIa to IIIc wherein R is glycidyl, and $R^1$ to $R^9$, $R^{11}$ and Z are defined as above.

Specifically, the refractive index may be influenced by these additives as desired. Thus, as detailed more specifically below, the presence of fluorine lowers the refractive index, while it is increased by the presence of bromine. In addition, by controlling the amount of glycidylic groups or the ratio of non-aromatic groups (especially of straight alkyl(ene) groups) to aromatic groups, this parameter may further be adjusted as required in order to obtain the desired refractive index difference between the cyanate polymer and the PFCB.

The polycyanate resins (polymeric cyanates) according to the invention may preferably be obtained by (co polymerizing at least one of the difunctional cyanates of formula I, optionally together with at least one of the other substances as mentioned above. Use of the said substances may be advantageous in order to further vary or improve the refractive index or other properties, e.g. compounding, moulding, or other optical properties.

If more than one difunctional cyanate is used in the preparation of the polycyanate, the ratio of the different difunctional cyanates may be freely chosen. Instead, the polymeric cyanates may be prepared using only one of the said difunctional cyanates of formula I. If additional components are present, the ratio is usually not critial. Preferably, the difunctional cyanates of formula I and optionally formula II are present in a molar amount of at least 25%, more preferred of at least 50%, and specifically preferred not more than 67% related to the total amount of moles of monomers present in the mixture to be (co-)polymerized. If one or more monocyanates are added to the mixture, they are preferable present in an amount of up to 20% or 25% by mol per mol of monomers to be polymerized. If phenols or alcohols are present, they are preferably present in an amount of up to about 60 or 65 mol-%. If glycidethers are added, they are preferably present in an amount of up to about 60 or even about 70 mol-%. Preferably, the monomer non-cyanates are incorporated in a total amount of not more than about 65 to 70 mol-% per mol of the total monomers to be polymerized.

The starting compounds for the polymeric cyanate as described above are preferably warmed up after mixing. The temperature may be chosen as required; a range of about 120° C. to 170° C. is preferred. Preferably, the reaction is performed in the absence of oxygen, e.g. in a sealed vessel (under an inert gas atmosphere). The mixture is allowed to react until a liquid or viscous prepolymer (resin) is obtained. This prepolymer or resin is soluble in useful solvents, preferably in solvents having high polarity, e.g. ethylethoxy acetate or chlorobenzene. In general, the prepolymer is processed in a respective solution, e.g. by spin-coating of a solution containing 25 to 75% by weight of the prepolymer, more preferably about 50% by weight of the prepolymer. The prepolymer solution may be applied to a suitable substrate or the like, consisting of e.g. silicon, quartz or an organic polymer, or onto a buffer layer, e.g. of PFCB. After being brought into the desired shape (e.g. into a layer of desired thickness) it is cured (e.g. at temperatures in the range of 200° to 260° C.) in order to provide the desired network between the cyanate groups.

It should be clear that the term "resin" is independent of the condition of the polymeric cyanate, e.g. whether it is in a prepolymerized condition or is partly or completely cured.

The polycyanate resins according to the present invention have a glass transition temperature in the range of 1000 to 300° C., and their refractive index at 1.55 μm may be controlled in the desired range, specifically of from about 1.40 to about 1.60. Specifically, the more fluorinated monomers are used, or the more fluorine parts per weight are present in the mixture, related to the weight of the mixture to be polymerized, the lower is the refractive index of the polycyanate copolymer obtained. This is especially the case if fully fluorinated alkyl(ene) chains are contained in the molecule. On the other hand, use of brominated derivatives of the cyanate monomers as defined above will raise the refractive index of the copolymer obtained. Thus, monomer compounds of e.g. formula IIIa wherein at least one of $R^1$, $R^2$, $R^3$, $R^4$ or $R^5$ or of e.g. formula IIIb wherein $R^{10}$ carries at least one bromine atom and R is N≡C, may be advantageously added to the mixture. Instead or in addition, brominated polyfunctional cyanates may also be used.

The polycyanate resins according to the present invention are used for the preparation of optical waveguide systems or waveguide structures, together with PFCB. PFCB as well as polycyanate resins may be applied in a dissolved state, e.g. by spin-coating. For such structures, PFCB may be used as a waveguide, while polycyanate resin is used as the material for buffer and/or cladding, the refractive index of the polycyanate resin being lower than that of the PFCB. Alternatively, PFCB may be used for buffer and/or cladding, while a polycyanate resin having a greater refractive index is used for the waveguide. In the preparation of such a waveguide structure, each layer applied is preferably cured (e.g. thermally) before the next, different layer is applied. For example, a first layer of either PFCB or polycyanate is spin-coated onto a suitable substrate, e.g. silicon, quartz, or an organic polymer, and is cured. If this layer shall serve as a buffer layer, the second layer serving as waveguide is made from the other material mentioned. Following curing, structurization may be performed e.g. via reactive ion etching (RIE) after this second layer has been sputtered with aluminum, and the etching mask is subsequently removed in a chemical etching bath. Last, a layer of the first material (or a material different to the first one, but having the same refractive index) is spin coated and cured, in order to provide the cladding layer. Alternatively, any one of the layers mentioned may be substituted by another material. Such materials are known in the art (e.g. SiO$_2$ as buffer)

The selection of suitably matching resins for waveguide, cladding, and optionally the buffer will be easily made by a skilled person who is able to control the refractive index via the teachings given in this application. The layers show excellent adhesion to each other and to the substrate.

The invention is now further illustrated by way of examples.

EXAMPLE 1

12.9 g of a substituted dicyanate of Bisphenol A (compound I wherein $R^1$–$R^4$ is H, $R^5$–$R^8$ is H, Z is hexafluoroisopropyl) and 3.7 g of a partly fluorinated monocyanate (compound IIIb wherein R is CN and $R^{11}$ is $CH_2$—$CF_2$—$CF_2$—$CF_3$) are heated to 160° C. in a sealed vessel for a time of four hours. The reaction is terminated before gelling starts, and a clear, pale yellow prepolymer is obtained which is viscous at 160° C. and is solid at room temperature. The prepolymer is brought into solution by mixing it with 50% by weight of ethylethoxyacetate (EEA). Spin-coating of this solution onto a substrate made of silicon wafer yields a layer which may be cured at 240° C. for one hour in a drying oven. The product has a refractive index of 1.4776 at 1.55 μm.

EXAMPLE 2

15.5 g of a partly fluorinated dicyanate (compound II wherein $R^{10}$ is $CH_2$—$CF_2$—$CF_2$—$CF_2$—$CF_2$—$CH_2$) and 3.5 g dicyanate of bisphenol A (compound I wherein $R^1$-$R^4$ is H, $R^5$-$R^8$ is H, Z is isopropyl) are heated to 160° C. in a sealed vessel for a time of about six hours. The reaction is terminated before gelling starts, and a clear, pale yellow prepolymer is obtained which is viscous at 160° C. and is solid at room temperature. The prepolymer is brought into solution by mixing it with 50% by weight of EEA. Spin-coating of this solution onto a substrate made of silicon wafer yields a layer which is cured at 240° C. for one hour in a drying oven. The product has a refractive index of 1.4739 at 1.55 μm.

EXAMPLE 3

10.6 g of a substituted dicyanate of Bisphenol A (compound I wherein $R^1$-$R^4$ is H, $R^5$-$R^8$ is H, Z is hexafluoroisopropyl) 3.1 g of a partly fluorinated dicyanate (compound II wherein $R^{10}$ is $CH_2$—$CF_2$—$CF_2$—$CF_2$—$CF_2$—$CH_2$) and 3.0 g of a monocyanate (compound IIIa wherein R is CN, $R^1$, $R^2$, $R^4$, $R^5$ is H, $R^3$ is Br) are heated to 160° C. in a sealed vessel for a time of four hours. The reaction is terminated before gelling starts, and a clear, pale yellow prepolymer is obtained which is viscous at 160° C. and is solid at room temperature. The prepolymer is brought into solution by mixing it with 50% by weight of EEA. Spin-coating of this solution onto a substrate made of silicon wafer yields a layer which may be cured at 240° C. for one hour in a drying oven. The product has a refractive index of 1.4958 at 1.55 μm.

EXAMPLE 4

6.9 g of a substituted dicyanate of Bisphenol F (compound I wherein $R^1$, $R^2$, $R^5$, $R^6$ is $CH_3$, $R^3$, $R^4$, $R^7$, $R^8$ is H, Z is $CH_2$) 5.2 g of a partly fluorinated dicyanate (compound II wherein $R^{10}$ is $CH_2$—$CF_2$—$CF_2$—$CF_2$—$CF_2$—$CH_2$) and 3.0 g of a partly fluorinated alcohol (compound IIIb wherein R is H, $R^{11}$ is $CH_2$—$CF_2$—$CF_2$—$CF_3$) are heated to 140° C. in a sealed vessel for a time of five hours. The reaction is terminated before gelling starts, and a clear, pale yellow prepolymer is obtained which is viscous at 140° C. and is solid at room temperature. The prepolymer is brought into solution by mixing it with 50. % by weight of EEA. Spin-coating of this solution onto a substrate made of silicon wafer yields a layer which may be cured at 240° C. for one hour in a drying oven. The product has a refractive index of 1.4780 at 1.55 μm.

EXAMPLE 5

12.9 g of a substituted dicyanate of Bisphenol A (compound I wherein $R^1$-$R^4$ is H, $R^5$-$R^8$ is H, Z is hexafluoroisopropyl), and 3.0 g of a fully fluorinated monocyanate (compound IIIb wherein R is CN, $R^{11}$ is C—$(CF_3)_2$) are heated to 130° C. in a sealed vessel for a time of four hours. The reaction is terminated before gelling starts, and a clear, pale yellow prepolymer is obtained which is viscous at 130° C. and is solid at room temperature. The prepolymer is brought into solution by mixing it with 50% by weight of EEA. Spin-coating of this solution onto a substrate made of silicon wafer yields a layer which may be cured at 240° C. for one hour in a drying oven. The product has a refractive index of 1.4756 at 1.55 μm.

EXAMPLE 6

A 50 weight-% solution of the prepolymer of example 1 in EEA is spin-coated onto a silicon wafer, yielding a layer of about 8 μm thickness. Curing is performed at 240° C. in a drying oven for one hour. Onto this cured layer, a PVCB solution (XU 35121.41 of The Dow Chemical Company) is spin-coated, again yielding a layer of 8 μm thickness. Also, this layer is cured at 240° C. in the drying oven for about 1 hour. According to known methods, an aluminum layer of about 100 nm is sputtered onto the said PFCB layer followed by its structurization by way of photolithography and chemical etching. Subsequently, the PFCB waveguides are structured by aid of oxygen RIE technique (typical rate 100 nm/min using pure oxygen), and the etching mask is removed by treatment in a chemical etching bath. Then, the upper cladding layer is applied by spin-coating another prepolymer solution as described in example 1 followed by curing at 240° C. for 1 hour. Using near field technique a difference of 0.0085 of the refractive index between the waveguide and its surrounding is measured. Cut-back measurements of light intensities of waveguides of different length yielded a loss of 0.35 dB/cm at 1.55 μm.

EXAMPLE 7

A 50 weight-% solution of PFCB (XU 35121.41 of The Dow Chemical Company) is spin-coated onto a silicon wafer, yielding a layer of about 8 μm thickness. Curing is performed at 240° C. in a drying oven for one hour. Onto this cured layer, the prepolymer of example 3 (50 weight-% in EEA solution) is spin-coated, again yielding a layer of 8 μm thickness. Also, this layer is cured at 240° C. in the drying oven for about 1 hour. According to known methods, an aluminum layer of about 100 nm is sputtered onto the said PFCB layer followed by its structurization by way of photolithography and chemical etching. Subsequently, the PFCB waveguides are structured by aid of oxygen RIE technique (typical rate 100 nm/min using pure oxygen), and the etching mask is removed by treatment in a chemical etching bath. Then, the upper cladding layer is applied by spin-coating the same PFCB solution as described above followed by curing at 240° C. for 1 hour. Using near field technique a difference of 0.0096 of the refractive index between the waveguide and its surrounding is measured. Cut-back measurements of light intensities of waveguides of different lenght yielded a loss of 0.43 dB/cm at 1.55 μm.

What is claimed is:

1. An optical waveguide system or waveguide structure comprising at least (a) a first material selected from poly (perfluorocyclobutanes); which is in direct contact with (b) a second material selected from polycyanate resins (co)polymerized from at least one difunctional cyanate of formula (I);

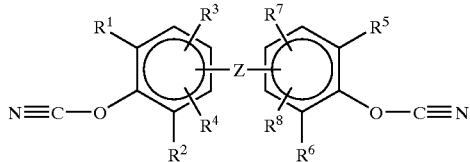

(I)

wherein $R^1$, $R^2$, $R^3$, $R^4$, $R^5$, $R^6$, $R^7$, and $R^8$ are independently selected from hydrogen, halogen, $C_1$–$C_{10}$ alkyl groups, $C_3$–$C_8$ cycloalkyl groups, $C_1$–$C_{10}$ alkoxy groups, phenyl groups, and phenoxy groups;

Z is selected from a chemical bond, $SO_2$, $CF_2CH_2$, CHF, $CH(CH_3)$, isopropylene, hexafluoroisopropylene, n-$C_1$–$C_{10}$ alkylene groups (optionally substituted with at least one fluorine), iso-$C_1$–$C_{10}$ alkylene groups (optionally substituted with at least one fluorine), O, $NR^9$, N=N, CH=CH, C(O)O, CH=N, CH=N—N=CH, alkyloxyalkylene groups (having 1 to 8 carbon atoms), S, and $Si(CH_3)_2$;

$R^9$ is selected from hydrogen and $C_1$–$C_{10}$ alkyl groups; and wherein said at least one difunctional cyanate is substituted with at least one fluorine atom.

2. An optical waveguide system or waveguide structure as claimed in claim 1, wherein the polycyanate resin has been copolymerized from at least one dicyanate of formula I, and at least one difunctional cyanate of formula II:

$$N\equiv C-O-R^{10}-O-C\equiv N \qquad (II)$$

wherein $R^{10}$ is $C(R')_2-R''-C(R')_2$,

R' is independently selected from hydrogen, fluorine, alkyl groups and alkenyl groups, and R'' is selected from non-aromatic hydrocarbon groups and arylenic structures, wherein the difunctional cyanate of formula II comprises at least one fluorine atom.

3. An optical waveguide system or waveguide structure as claimed in claim 2, wherein the alkyl or alkenyl group of R' is fluorinated.

4. An optical waveguide system or waveguide structure as claimed in claim 2, wherein the polycyanate resin has been copolymerized from at least one dicyanate of formula I, at least one difunctional cyanate of formula II, and at least one of the following compounds:

(i) monocyanates having formula IIIa or IIIb:

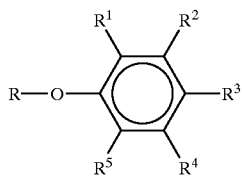

IIIa $$R-O-R^{11} \qquad IIIb,$$

wherein $R^1$ to $R^5$ are as previously defined for the dicyanate of formula I, R is N≡C— and $R^{11}$ is a straight, branched, or cyclic non-aromatic hydrocarbon radical or a non-aromatic hydrocarbon radical comprising a cyclic structure;

(ii) phenols having either formula IIIa above or formula IIIc:

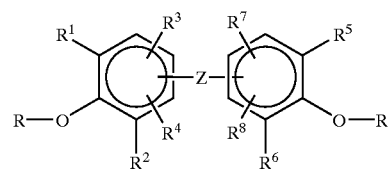

IIIc wherein Z and $R^1$ to $R^8$ are as defined above for formula I and R is hydrogen;

(iii) monoalcohols having formula IIIb wherein $R^{11}$ is as defined above, and wherein R is hydrogen, (iv) non-aromatic dihydroxy compounds having formula Vd $$R-O-R^{10}-O-R \qquad Vd$$

wherein R is hydrogen and $R^{10}$ is as defined for the dicyanates of formula IV above, and (v) glycidylethers of formulas IIIa to IIIc wherein R is glycidyl, the other radicals being as defined above.

5. An optical waveguide system or waveguide structure as claimed in any one of claim 2, 3, 4, or 1, wherein both the first and the second materials are in the form of a thin layer, the layers directly adhered to each other.

6. An optical waveguide system or waveguide structure according to claim 5, wherein either the waveguide is made of the first material and at least one of a buffer layer and a cladding layer is made of the second material, or the waveguide is made of the second material and at least one of a buffer layer and a cladding layer is made of the first material.

7. The optical waveguide system or waveguide structure of claim 1, wherein the alkyl groups included in formula (I) are selected from unfluorinated alkyl groups, fully fluorinated alkyl groups, and alkyl groups comprising at least one fluorine atom.

8. The optical waveguide system or waveguide structure of claim 1, wherein the alkyl groups included in formula (I) are fully fluorinated.

9. The optical waveguide system or waveguide structure of claim 1, wherein the aryl groups included in formula (I) are selected from unfluorinated aryl groups, fully fluorinated aryl groups, and aryl groups comprising at least one fluorine atom.

10. The optical waveguide system or waveguide structure of claim 1, wherein the aryl groups included in formula (I) are fully fluorinated.

* * * * *

UNITED STATES PATENT AND TRADEMARK OFFICE
CERTIFICATE OF CORRECTION

PATENT NO. : 6,853,790 B1
DATED : February 8, 2005
INVENTOR(S) : Monika Bauer et al.

It is certified that error appears in the above-identified patent and that said Letters Patent is hereby corrected as shown below:

<u>Title page,</u>
Item [57], ABSTRACT,
Line 10, "fluorinated with" should read -- fluorinated, with --.
Lines 16-17, "Si(CH$_3$)$_2$ optionally" should read -- Si(CH$_3$)$_2$, optionally --.

<u>Column 9,</u>
Line 38, "alkyl groups and" should read -- alkyl groups, and --.

<u>Column 10,</u>
Line 35, "any of one" should read -- any one --.
Line 35, "claim" should read -- claims --.

Signed and Sealed this

Nineteenth Day of July, 2005

JON W. DUDAS
*Director of the United States Patent and Trademark Office*